United States Patent [19]
Dowling, Jr. et al.

[11] Patent Number: 5,706,857
[45] Date of Patent: Jan. 13, 1998

[54] FUEL TANK VENT VALUE AND PROBE ASSEMBLY

[75] Inventors: Edward J. Dowling, Jr., Cottonwood; Donald C. Esperson, Mesa; Robert F. Staab, Phoenix, all of Ariz.

[73] Assignee: Arizona Instruments Inc., Phoenix, Ariz.

[21] Appl. No.: 433,161

[22] Filed: May 3, 1995

[51] Int. Cl.⁶ .............................. F61K 37/00; F61K 24/04
[52] U.S. Cl. .............................. 137/558; 137/202; 141/95
[58] Field of Search ..................... 137/202, 558, 137/587, 551; 141/95

[56] References Cited

U.S. PATENT DOCUMENTS

| | | | |
|---|---|---|---|
| 1,406,196 | 2/1922 | La Londe | 137/202 |
| 2,243,262 | 5/1941 | Smith | 137/202 |
| 2,625,169 | 1/1953 | Parrish | 137/202 |
| 2,812,772 | 11/1957 | Moore | 137/202 |
| 3,736,950 | 6/1973 | Smallwood | 137/202 |
| 4,036,255 | 7/1977 | Wilson | 137/202 |
| 4,079,743 | 3/1978 | Weston | 137/202 |
| 5,427,137 | 6/1995 | Bowen | 137/558 X |
| 5,515,891 | 5/1996 | Langlois | 137/202 X |

FOREIGN PATENT DOCUMENTS 34279 2/1983 Japan ........................ 137/202

*Primary Examiner*—John Rivell
*Attorney, Agent, or Firm*—Meschkow & Gresham, P.L.C.

[57] ABSTRACT

A vent valve assembly is provided which will allow a probe for a gauging system to be added to underground fuel tanks which include a vapor recovery system. The support assembly replaces existing float valve assemblies and combines a valving structure with a support for a fuel system gauge probe. A gauging system may be easily and inexpensively added to existing underground fuel tanks with minimum disruption to the operation of the gas station.

20 Claims, 7 Drawing Sheets ns5,706,857

FUEL TANK VENT VALUE AND PROBE ASSEMBLY

BACKGROUND OF THE INVENTION

This invention relates to the field of measuring the volume of liquid in a tank, in general, and to a vent valve and support for probe assembly for underground fuel tanks, in particular.

Fuel such as gasoline is typically stored in underground storage tanks where the volume of fuel cannot be visually or directly determined. In the past, one commonly utilized way to measure the volume of fuel in the tanks was by use of a calibrated measuring rod which was manually inserted into a tank standpipe which is intended to be utilized to fill the tank. In recent years there have been significant improvements over the prior manual measuring methods. These improvements have resulted in gauging apparatus which is highly accurate in determining the fuel volume. These improvements have been necessitated by governmental rules and regulations which mandate that leaks from underground storage tanks be detected.

These rules and regulations can be complied with by measuring with great precision the volume of fuel in all underground storage tanks. All underground fuel tanks will require an arrangement to monitor the fuel volume.

The various gauging systems which have been developed in recent years typically utilize a probe which is suspended in the fuel tank. The type of probe utilized is dependent on the principles utilized in the measuring technique employed. In one type of system, an ultrasonic transducer is suspended in the fuel tank at the end of a long probe. In another type of system, the magnetostrictive properties of materials are utilized in a probe to measure the liquid level in the underground tank.

There is little difficulty in installing a probe in a new tank. However, there are considerable numbers of underground storage tanks already installed in the ground. It is considerably more difficult to install a probe in an installed tank.

Existing fuel tanks have multiple unused bungs or ports on their top sides. These multiple bungs permit some flexibility in the installation of the tanks relative to the position of access to the tank for a fuel fill standpipe, a standpipe for the fuel pump and a vent standpipe. However, in the typical installation, after ports have been selected for fuel fill, fuel outlet and venting and the appropriate connections have been made, dirt is backfilled over the tank and concrete is poured over the top of the tank. The exact location of the unused ports is usually not recorded.

Installation of a probe in an installed tank requires that an unused port or bung on the tank be uncovered. To uncover the unused ports, the concrete over the tank is cut with a diamond saw and then removed. Next, the dirt must be carefully removed to find an unused port. This part of the installation is labor intensive because the use of a backhoe or other power equipment to remove the dirt runs the risk of damaging the tank. Therefore, laborers must use shovels and picks to carefully remove dirt from the top of the tank until a port is found which will be suitable for a probe. The cost of installing a probe in this manner is thousands of dollars.

On older fuel tanks the vent port typically vents vapors directly to the atmosphere, typically over the roof of the gas station. However, on all fuel tanks which are of a type referred to as Stage One Vapor recovery tanks, a vent standpipe is included. In a Stage One vapor recovery system, each underground tank has a vent standpipe which is coupled to a tank truck at the same time that the fuel hose from the tank truck is connected to the fuel inlet pipe. As fuel is pumped into the underground tank through the fuel hose, the vapors that are in the underground tank are shunted back into the tank truck through a vent hose coupled to the vent standpipe. As a gallon of fuel goes into the tank, the volume of vapors displaced is displaced into the very truck that is delivering fuel. Thus, the fuel vapors which would otherwise be vented into the atmosphere during the filling of the underground tank are captured.

Each Stage One vent standpipe includes a valve. The valve is typically a float valve which will seat when the liquid level in the tank approaches approximately 95% of the tank volume capacity. At that point, the closure of the valve will cause the flow rate of fuel into the tank to change. The change is so noticeable that the individual fueling the tank will clearly recognize it. The result is that the fueler is alerted to cease refueling. A 95% fill is typically chosen as the point for closure of the vent because the tank will still have sufficient remaining capacity to allow the fueler sufficient time to shut the fill valves and to drain the fuel hose into the tank without spilling fuel on the ground.

It would be advantageous to provide for simplified installation and mounting of gauging system probes in underground fuel tanks such that it is not necessary for the top of an underground fuel tank to be exposed by labor intensive methods.

SUMMARY OF THE INVENTION

In accordance with the principles of the invention, a vent valve assembly is provided which will allow a probe for a gauging system to be added to underground fuel tanks which include a vapor recovery system. The support assembly replaces existing float valve assemblies and combines a valving structure with a support for a fuel system gauge probe.

In accordance with the principles of the invention, a gauging system may be easily and inexpensively added to existing underground fuel tanks with minimum disruption to the operation of the gas station.

BRIEF DESCRIPTION OF THE DRAWING

The invention may be better understood from a reading of the following detailed description of preferred embodiments of the invention taken in conjunction with the drawing in which like reference designations are used for like parts and in which.

DETAILED DESCRIPTION

Figure 1:
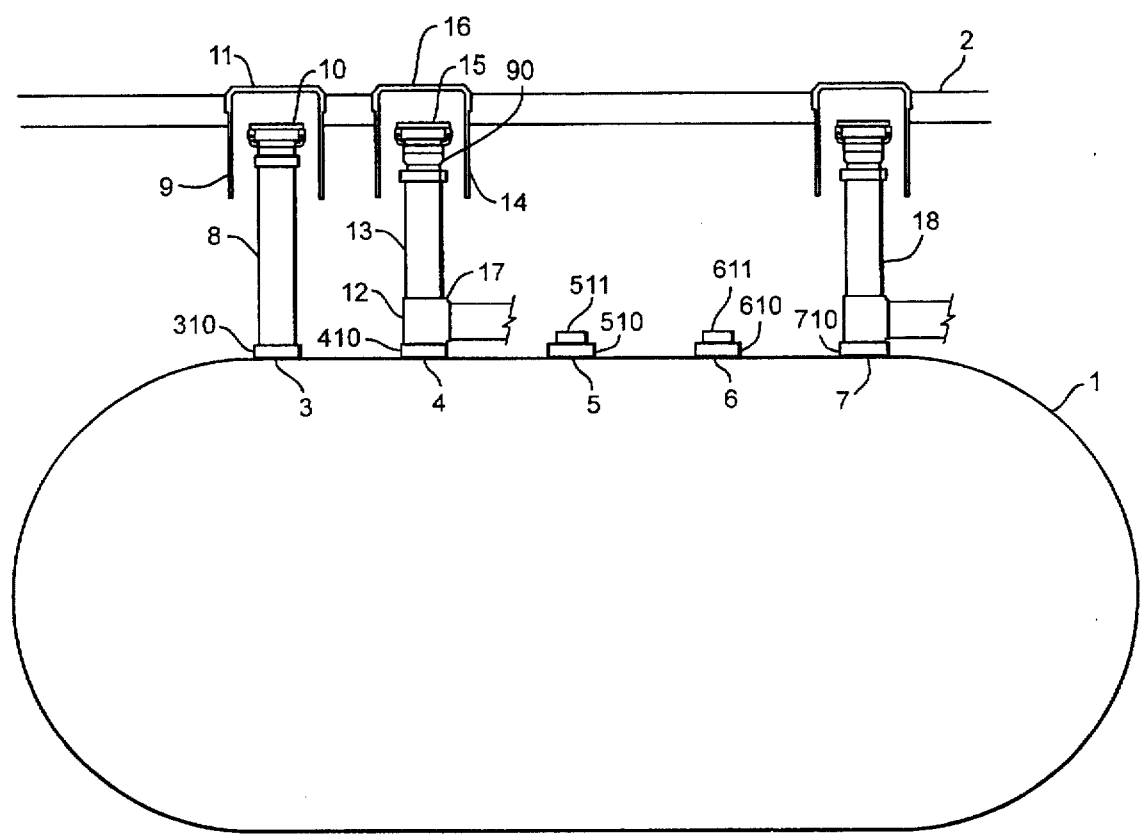
FIG. 1 illustrates an underground fuel tank of the type to which the invention may advantageously be applied.

A typical fuel tank installation to which the invention may be advantageously applied is illustrated in FIG. 1. In FIG. 1, fuel tank 1 is buried underground under a concrete pad 2. The tank 1 includes several ports or bungs 3, 4, 5, 6, and 7. Typically, a tank has an extra number of ports or bungs beyond what is necessary to establish connections to the fuel tank 1. This is so that different installations can utilize whichever bungs or ports are most convenient. Each port includes a threaded collar 310, 410, 510, 610 and 710, respectively. The unused ports 5,6 merely have plugs 511, 611 screwed into the collars 510, 610. Port 3 is utilized for fuel inlet and includes a riser pipe 8 extending into a manhole or containment box 9. The top end of the riser pipe 8 has a snap cover assembly 10 screwed thereon. The containment box 9 is closed off by cover 11.

Fuel tank 1 includes an outlet port 7 from which fuel outlet 18 extends. Typically, a turbine pump is utilized to pump the fuel from tank 1. In some applications, the pump may be disposed within the tank 1 and in other applications, the pump will be outside the tank 1. Since this aspect of fuel tank construction forms no part of the invention, no details are shown with respect to the fuel pump installation.

For the Stage One Vapor Recovery Fuel Tank shown in FIG. 1, port 4 is selected for vapor vent recovery. An extractor fitting 12 is screwed into port 4. The extractor fitting 12 is a T fitting which connects to a pipe 17 that may be connected to other fuel tanks. In other applications, the extractor fitting may be in the form of a cross to permit multiple tanks to be connected together. Extending upwardly from extractor fitting 12 is vent riser pipe 13. The vent riser pipe 13 extends into a manhole or containment box 14.

Pipe 13 terminates with a snap on vent cap assembly 15. Containment box 14 is closed by cover 16.

During a normal fuel fill, the covers 11 and 16 will be removed as will snap covers 10 and 15 from the containment boxes 9 and 14, respectively. The fueler will connect a fuel line from the tank truck to the snap on fitting at the end of riser 8. He will also connect a vapor recovery pipe to the snap on end fitting of vapor riser pipe 13. Fuel will be loaded into the tank 1 until a float valve is activated.

Figure 2:
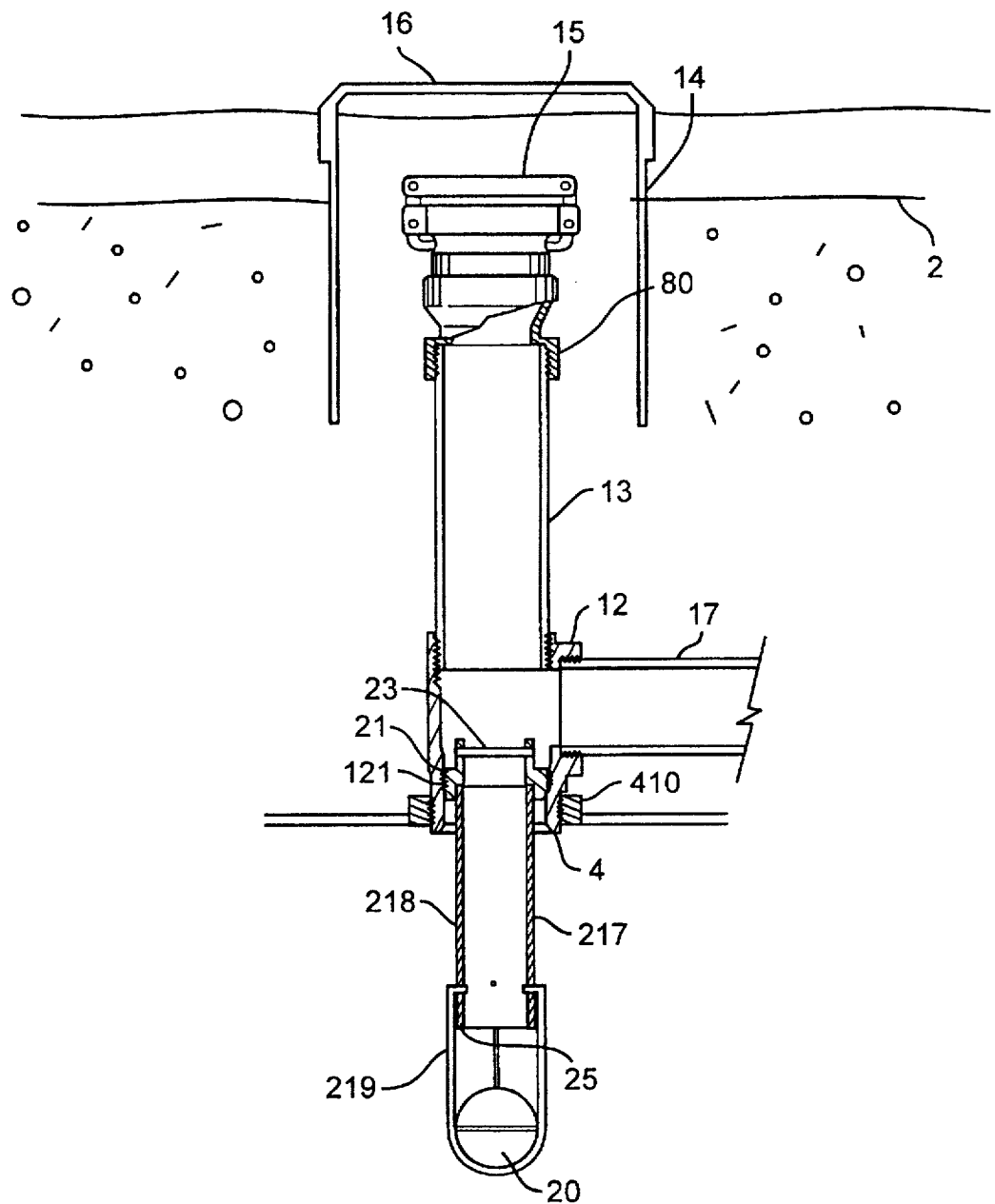
FIG. 2 illustrates a prior art vent valve utilized in the fuel tank of FIG. 1.

FIG. 2 shows, in greater detail, the vapor recovery structure including a vapor vent valve 217. The vapor vent valve 217 includes a tube or float standpipe 218 which has a threaded portion 21 at its upper end and a valve seat 25 at its lower end. The threaded portion 21 engages matching threads 121 on the internal surface of extractor fitting 12. At the lower end of the vent valve 217, a caged structure 219 contains a float ball 20. The float standpipe 218 has a ⅛" diameter vent hole in it (which is not shown) to allow for the slow release of pressure that may build up as fuel continues to flow into the tank after the valve closes.

In accordance with the principles of the invention, the vent valve structure 217 is removed. This is accomplished by removing cover 16 from the containment box 14, unscrewing valve cover assembly 15, and then inserting an extractor tool to engage a pin 23, to unscrew the vent valve assembly 217 and remove it.

Figure 3:
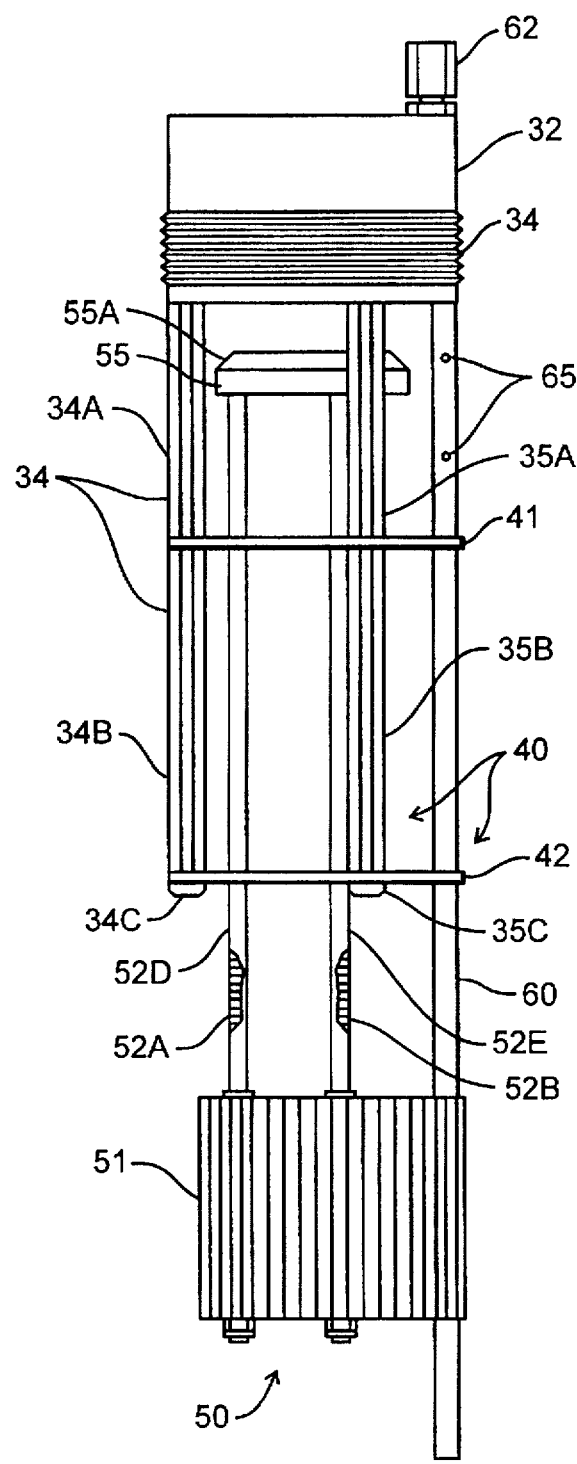
FIG. 3 illustrates a device in accordance with the principles of the invention.
Figure 4:
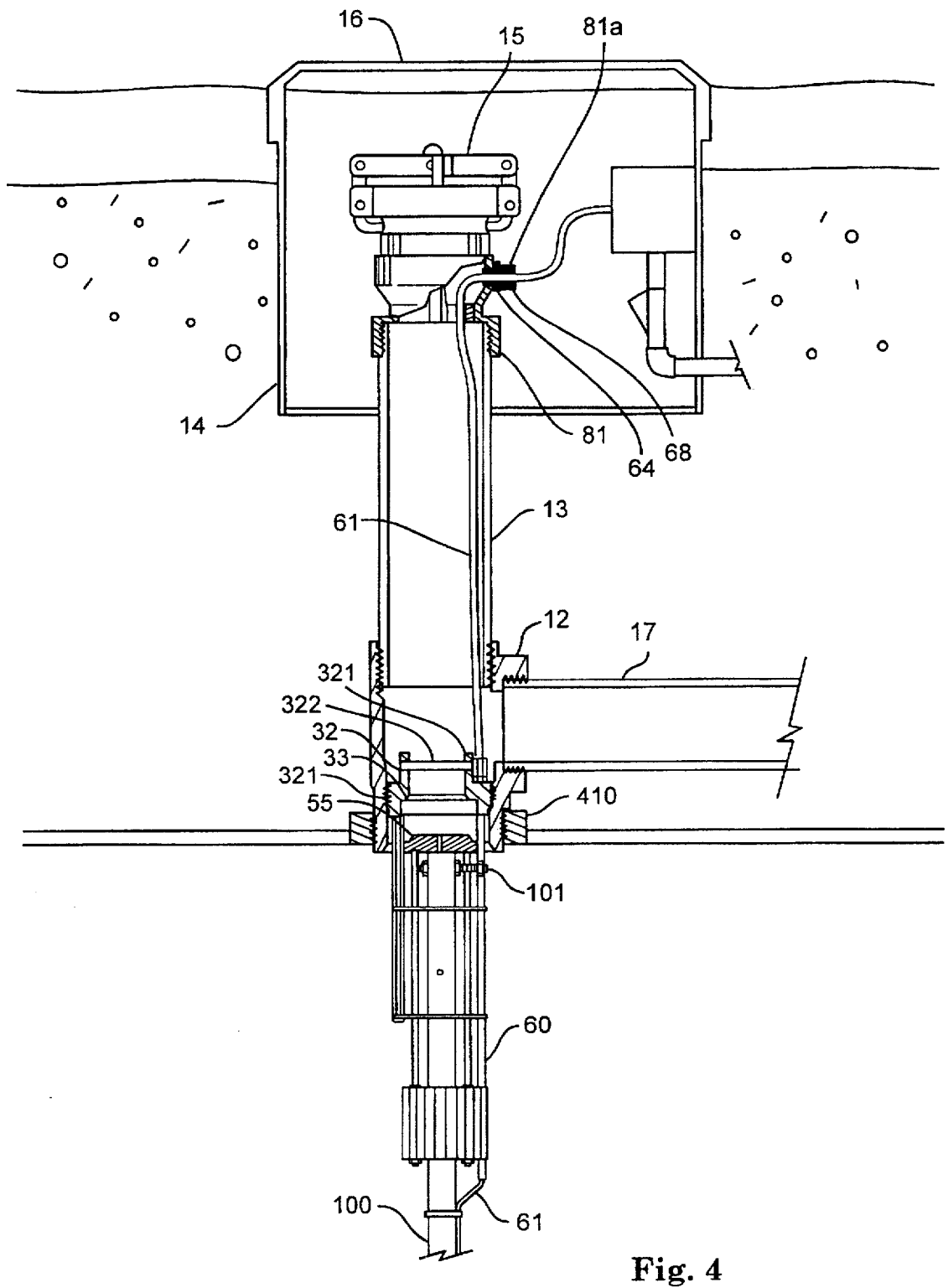
FIG. 4 illustrates in partial cross-section the device of FIG. 3 installed in the underground tank of FIG. 1 with only a portion of the tank shown and shown in cross-section.

FIGS. 3 and 4 illustrate an installation in accordance with the invention wherein valve and probe support 40 is substituted for the vent valve 217 of FIG. 2. As shown in FIG. 4, the vent valve and probe support assembly 30 supports a commercially available probe 100 which may be of a conventional design such as a commercially available ultrasonic type probe. The device in accordance with the invention is shown without the probe in FIG. 3. The device has three assemblies: the vent valve body portion 32, a support assembly 40, and a float assembly 50. The vent valve body portion 32 is a generally cylindrical fitting which has an external threaded surface portion 34 which engages the threads 121 of extractor fitting 12.

The support or cage portion 40 includes three supports 34, 35, and 36 extending downward from the body 32. For purposes of clarity, FIG. 3 and FIG. 4 do not show all of the supports. The supports 34, 35, and 36 are most clearly shown in FIG. 5. Two horizontal plates 41, 42 are held in place by means of vertical supports 34, 35, and 36. Each plate includes a central aperture 41a, 42a through which the probe 100 extends. Each vertical support is made of hexagonal stock with male and female threads on opposite ends and includes members 34a, 34b, 35a, 35b, and 36a, 36b respectively, which serve to space apart the plates 41 and 42 from the body 32. Screws 34c, 35c, and 36c secure the cage in position. Each of the plates 41 and 42 include apertures 52D, 52E and 52F through which float support rods 52, 53, and 54 may freely move vertically.

Figure 7:
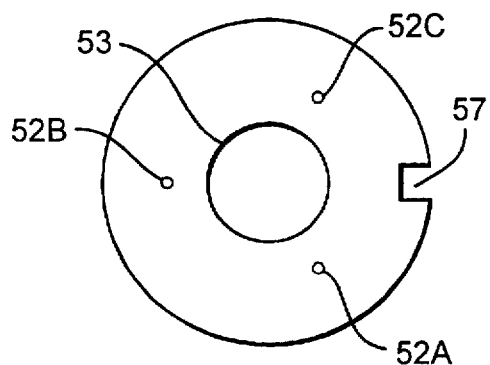
FIG. 7 illustrates the float of the device of FIGS. 3 and 4 from a top view.
Figure 8:
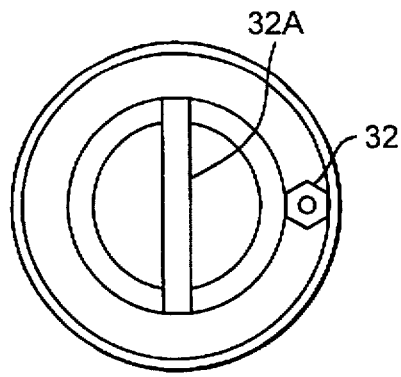
FIG. 8 is a top view of body member 32.

The valve assembly 50 includes a float 51 which is a foamed nitrile which is commercially available under the trade name Nitrophyl. As can be most clearly seen in FIG. 7, the float 51 is of generally circular cross-section. Extending vertically upward from the float 51 are the threaded support rods 52a, 52b, and 52c which terminate at their upper end in a valve 55. Tubes 52D, 52E and 52F cover the threaded rods to prevent the threads from binding and rubbing on plates 41, 42 when the float 51 moves up and down. Float 51 includes a central aperture 53. Valve 55 is of generally disk shape and is formed of a PET-P plastic which is commercially available under the name Ertalyte. Both the float 51 and the valve 55 are formed from materials which are not sensitive to gasoline. The valve 55 includes a beveled valving surface 55a.

Figure 6:
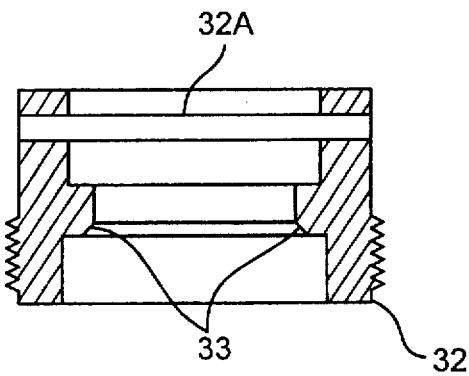
FIG. 6 is a cross sectional view of body member 32.

As shown more clearly in FIG. 6, the body 32 includes a mating valve seat surface 33 which forms the valve seat for valve 55. It should also be noted that FIG. 3 shows the valve in the open position whereas FIG. 4 shows the valve in the closed position.

Figure 5:
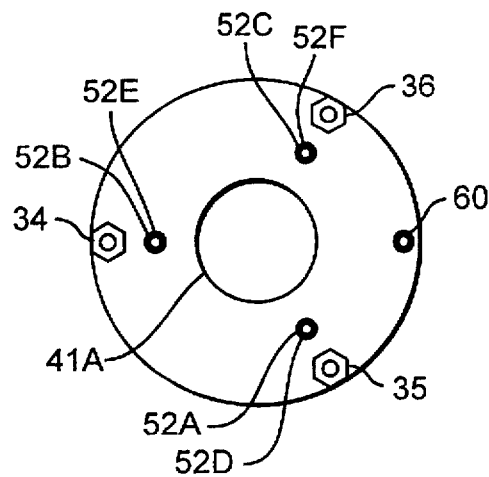
FIG. 5 is a view taken along lines 5—5 in FIG. 3.

Each probe includes a cable which must extend from the tank. A tube cable support 60 extends into the body 32 and through apertures in plates 41 and 42 as well as through a groove 57 in float 51 which is shown in FIG. 5. The cable 61 extending from the probe runs through the tube 60 into the body 32. A compression fitting 62 provides a positive seal and support to the cable 61. As shown in FIG. 4, the cable 61 extends through vent riser 13.

The existing vapor recovery adaptor 90 as shown in FIG. 2 is removed from the riser pipe. As shown in FIG. 4, a new vapor recovery adaptor 81 having a cable exit 81a is threaded onto riser pipe 13. The adaptor 81 further includes a bore 64 in its sidewall into which an additional compression fitting 65 is inserted. The cable 61 extends through fitting 68 to junction box 66 and from the junction box 66 through the containment box to the electronic processing facilities at the gas station.

The probe 100 generally rests on the bottom of the tank 1. To accommodate for vertical movement of the probe 100, a pin 101 extends outward from the probe 100. The pin 101 permits limited vertical and rotational movement of the probe 100. The cable tube 60 includes one or more vent holes 65. If pressure were to build up in the tank 1 when the valve 54 slams shut against the valve seat 55, the pressure would tend to drive fuel up the tube 60. Although the compression fitting 62 will be liquid tight, by providing vent hole 65 in the tube 60, the fitting 62 will not be subjected to unusually high pressures. This way, the fuel, if any, in the tube 60 can be vented out through either of the holes 65.

The installation of a probe in a vent riser is as follows. Turning back to FIG. 2, cover 16 is removed from the containment box 14 and the cap 15a is removed from the cap assembly 15. The cap 15 simply snaps off and is of conventional design. Vapor recovery fitting 80 is unscrewed. An extractor wrench is then extended through the standpipe 13 and the vent valve 17 is removed. The installer then measures through the vent riser 13 to the bottom of the tank 1. The installer will measure and cut the probe to the appropriate length. The installer will then drill a hole in an upper end portion of the probe to install the pin 101. The probe cable will be guided through the tube 60. The probe and support assembly are then carefully inserted into the vent standpipe 13. The extractor wrench engages pin 32a shown in FIG. 6 on the body portion 32. The body portion 32 is then turned so that the screw thread carried on its threaded portion 321 engages the threaded portion 121 of extractor fitting 12.

A new "cable exit" vapor recovery adaptor 81 is turned onto the top of riser 13. Cable 61 is extended through the adaptor 81 and connected to junction box 90 which is mounted in the containment box 14. The cap assembly 15 is then secured to the top of the adaptor 81. Cable 61 is connected to the electric monitoring system wiring at junction box 90.

Figure 9:
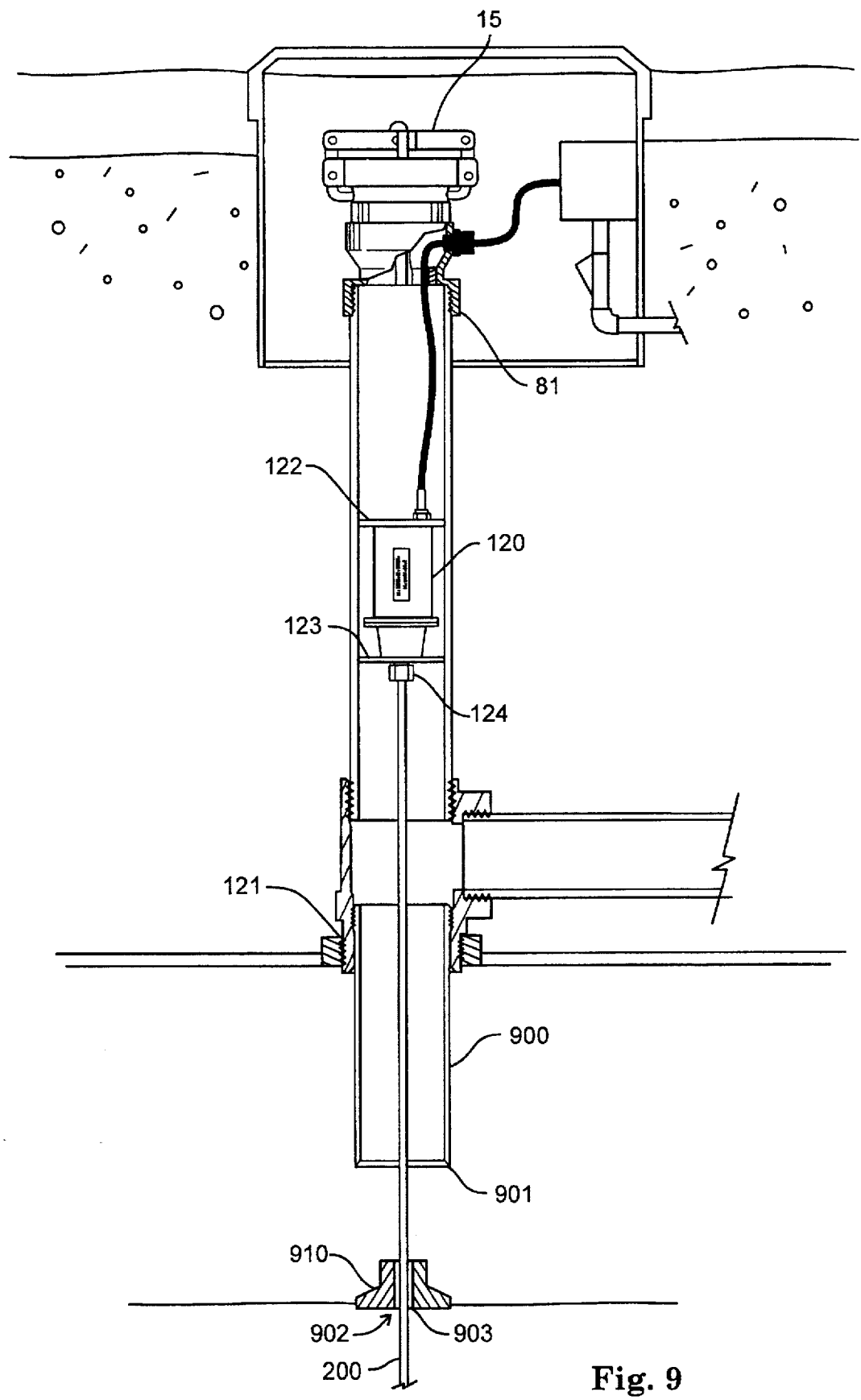
FIG. 9 illustrates in partial cross-section a second embodiment of the invention.
Figure 10:
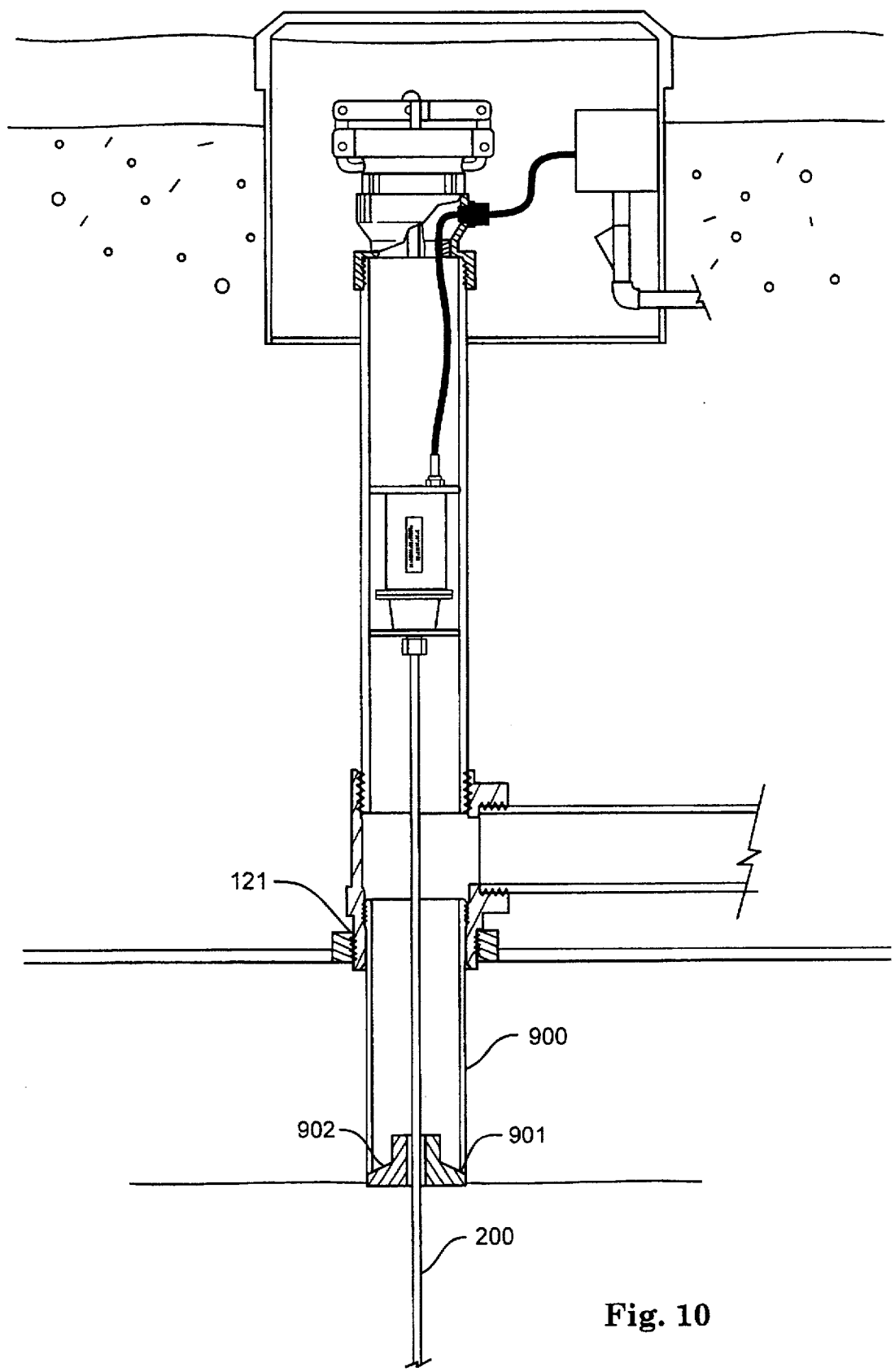
FIG. 10 illustrates the device of FIG. 9 with the valve in the closed position.

A second embodiment of the invention is illustrated in FIGS. 9 and 10. This embodiment is adaptable for use with probes which can have their probe head mounted outside the fuel tank. This structure is particularly advantageous when used with magnetostrictive probe assemblies.

As in the first embodiment, the existing vent valve assembly is removed. An adaptor 81 is utilized in the second embodiment to provide for a cable exit from the vent standpipe.

In this arrangement, the vent valve is replaced with a cylindrical sleeve 900 which is threaded at its upper portion to engage in threads 121 of extractor fitting 12. The lower end of the sleeve 900 is profiled to form a valve surface 901. The length of the sleeve 900 determines the depth of fuel at which the valve will close. A magnetostrictive probe 200 extends through the sleeve 900 into the fuel tank 1. A valve float 902 has a central aperture 903 through which probe 200 extends. The probe 200 acts as a guide rod for the float 902. The aperture 903 of the float 902 is selected to be sufficiently larger than the diameter of the probe 200 so that it is the equivalent of a ⅛" diameter vent hole.

The upper surface 910 of the valve float 902 is profiled to match the valve surface 901 of the sleeve 900.

The magnetostrictive probe head 120 is supported in the vent riser pipe 13. Any number of arrangements may be utilized to support the probe assembly. The weight of the probe head 120 and locating plates 122 and 123 keep the probe shaft 200 in place in the tank. Attached to the probe head 120 are support plates 122 and 123 at its upper and lower ends.

Support plates 122 and 123 are disk shaped and are provided to limit lateral movement of the probe head 120. Both plates 122 and 123 include apertures so that vapors may exhaust past the probe head when venting is to occur. The probe 200 connects to the probe head with a seal 124.

In operation, when fueling occurs, cap 15a is removed and the vent hose is snapped into place. As fueling occurs, the valve float 902 floats on the surface of the fuel, guided by the probe 200. Vapor exhausts through sleeve 900, past the probe head 920 and into the vent hose connected in place of cap 15a. When the fuel reaches the level that the valve float 902 seats against the sleeve 900, the ability of the vent to vent vapors decreases dramatically. The vent diameter is suddenly changed from that of the sleeve 900 to the approximate ⅛" diameter equivalent provided by the annular clearance between the valve float 902 and the probe 200.

Installation of this second embodiment is similar to that of the first embodiment.

The invention has been described in terms of illustrative embodiments. It will be readily apparent to those skilled in the art that changes may be made to the embodiments without departing from the spirit and the scope of the invention. The invention is to be limited only in scope by the claims appended hereto.

What is claimed is:

1. A vent valve and probe support assembly for use in underground fuel tanks to support a probe utilized for fuel measurements in said tank, said tank being of the type having a vapor recovery system wherein the vapor recovery system includes a vapor recovery port on the top surface of the tank, a pipe assembly mounted on said port and having internal threads adapted to receive a vent valve inserted through said port into said tank, said pipe terminating in a removable cap adapted to receive a vapor recovery hose from a fuel truck, said vapor vent and probe assembly comprising:

a body member having external threads adapted to engage said pipe internal thread;

a support assembly extending from said body to support said probe in said tank; and a float and valve assembly, said float and valve assembly comprising a generally cylindrical float carrying a valve member, said float having a central aperture and adapted to be positioned concentric with said probe and moveable in an axial direction of said probe, said float and valve assembly operating to vent said tank through said pipe when said fuel is below a first predetermined level in said tank and to restrict venting through said pipe when the fuel level in said tank reaches a predetermined level.

2. An assembly for use in a vent riser on an underground fuel storage tank, said vent riser being used for recovery of fuel vapors during filling of said tank, said vent riser being of generally cylindrical shape and having an internally threaded portion at a lower end for supporting a valve in said tank, said assembly comprising:

a body portion of generally cylindrical shape and having an externally threaded surface for engaging said internally threaded portion, said body portion having a vent passage in communication with said vent riser and carrying a valve surface, said valve surface being positioned concentric to said vent passage;

a float having a central aperture, said aperture being of a diameter such that said float will be movable in concentric axial alignment with a measuring probe supported in axial alignment with said vent riser;

a valve carried by said float, said valve being adapted to engage said valve surface when the fuel level in said tank is at a predetermined level.

3. An assembly in accordance with claim 2 comprising:

a probe support assembly extending from said body portion to maintain said probe in axial alignment with said vent riser.

4. A vent float assembly for use with an underground fuel storage tank of the type having a vent riser used for recovery of vapors during filling of the tank, said vent riser having an internally threaded portion at a lower end, said assembly comprising:
- a cylindrical body portion having an externally threaded portion adapted to engage said threaded portion of said riser;
- a cylindrical valve seat carried on said body portion;
- a float disposed below said body portion, said float having a central aperture sized such that said float may be positioned concentric to a measuring probe supported within said tank in axial alignment with said vent riser;
- a valve surface supported above said float, said float moving said valve surface into engagement with said valve seat when the fuel level in said tank reaches a predetermined level to restrict the venting of said tank.

5. A vent assembly in accordance with claim 4, comprising:
- a support structure extending downward from said body portion to restrict movement of a measuring probe.

6. A vent assembly in accordance with claim 5 comprising:
- a valve plate carrying said valve surface; and
- support members supporting said valve plate above said float.

7. A vent assembly in accordance with claim 6 wherein:
- said support structure guides said support members in an axially vertical direction.

8. A vent assembly in accordance with claim 6 wherein:
- said valve plate includes an aperture, said aperture providing for restricted venting from said tank when said valve surface engages said valve seat.

9. In combination:
- a measuring probe for use in measuring the volume of liquid in a fuel tank, said tank of the type having a vent riser used in a vapor recovery system, said probe extending downward from said vent riser into said tank and being disposed in axial alignment with said riser; and
- a valve assembly, said valve assembly being disposed in and extending downward from said vent riser, said valve assembly being disposed in axial alignment and concentric to said probe, said valve assembly being operative to reduce the effective vent opening from said tank when fuel in said tank is at a predetermined level.

10. The combination of claim 9, wherein:
- said valve assembly and measuring probe have a combined diameter which permits assembly in said vent riser.

11. A measuring probe and vent valve assembly kit for use with a fuel storage tank of the type having a vent riser for the recapture of vapors during fill of the tank, said vent riser having a first fitting coupled to a port on said tank, said fitting having an internally threaded lower portion and a pipe extending upward from said fitting, said pipe being threaded at its upper end to receive a cap assembly, and a cap assembly coupled to said pipe upper end, said kit comprising:
- a measuring probe for use in measuring the volume of liquid in said tank, said probe being positioned extending in said tank in coaxial arrangement with said vent riser; and
- a valve assembly, said valve assembly being disposed in and extending downward from said vent riser and in coaxial arrangement with said probe, said valve assembly being operative to reduce the effective opening of said vent riser when fuel in said tank reaches a predetermined level.

12. A kit in accordance with claim 11 further comprising:
- a replacement cap assembly having a sidewall aperture for providing a cable access to electronic circuitry for said probe.

13. A vent valve and measuring probe assembly for use in a fuel tank having a vent pipe extending upward from said tank, said assembly comprising:
- a measuring probe;
- a support member adapted to be inserted into said vent pipe and to connect to said vent pipe, said support member being positioned coaxial to said probe;
- a valve seat carried on said support member;
- a float having an aperture and positioned coaxial to said probe;
- a valve surface movable with said float to engage said valve seat when the liquid level in said tank reaches a predetermined level to thereby restrict venting from said tank.

14. An assembly in accordance with claim 13 wherein:
- said valve surface comprises a valve plate having a central aperture and positioned to be coaxial to said probe.

15. An assembly in accordance with claim 14 comprising:
- a structure for supporting said valve plate a predetermined distance above said float.

16. An assembly in accordance with claim 13 wherein:
- said support member comprises a cylindrical pipe having its upper end secured to said vent pipe; and
- said valve seat comprises a lower end surface of said cylindrical pipe.

17. An assembly in accordance with claim 16 wherein:
- said valve surface comprises a surface portion of said float.

18. An assembly in accordance with claim 13 wherein:
- said probe is an ultrasonic measuring probe.

19. An assembly in accordance with claim 13 wherein:
- said probe is a probe of the magnetostrictive type.

20. An assembly in accordance with claim 13 wherein:
- said probe is an ultrasonic probe comprising an ultrasonic transducer at its lower end; and
- said assembly further comprises a cable extending from said transducer alongside said probe, and a tube extending from said support, said cable extending through said tube into said vent pipe; said tube having at least one vent hole.

* * * * *